C. CREMER.
FARM FENCE.
No. 185,217. Patented Dec. 12, 1876.
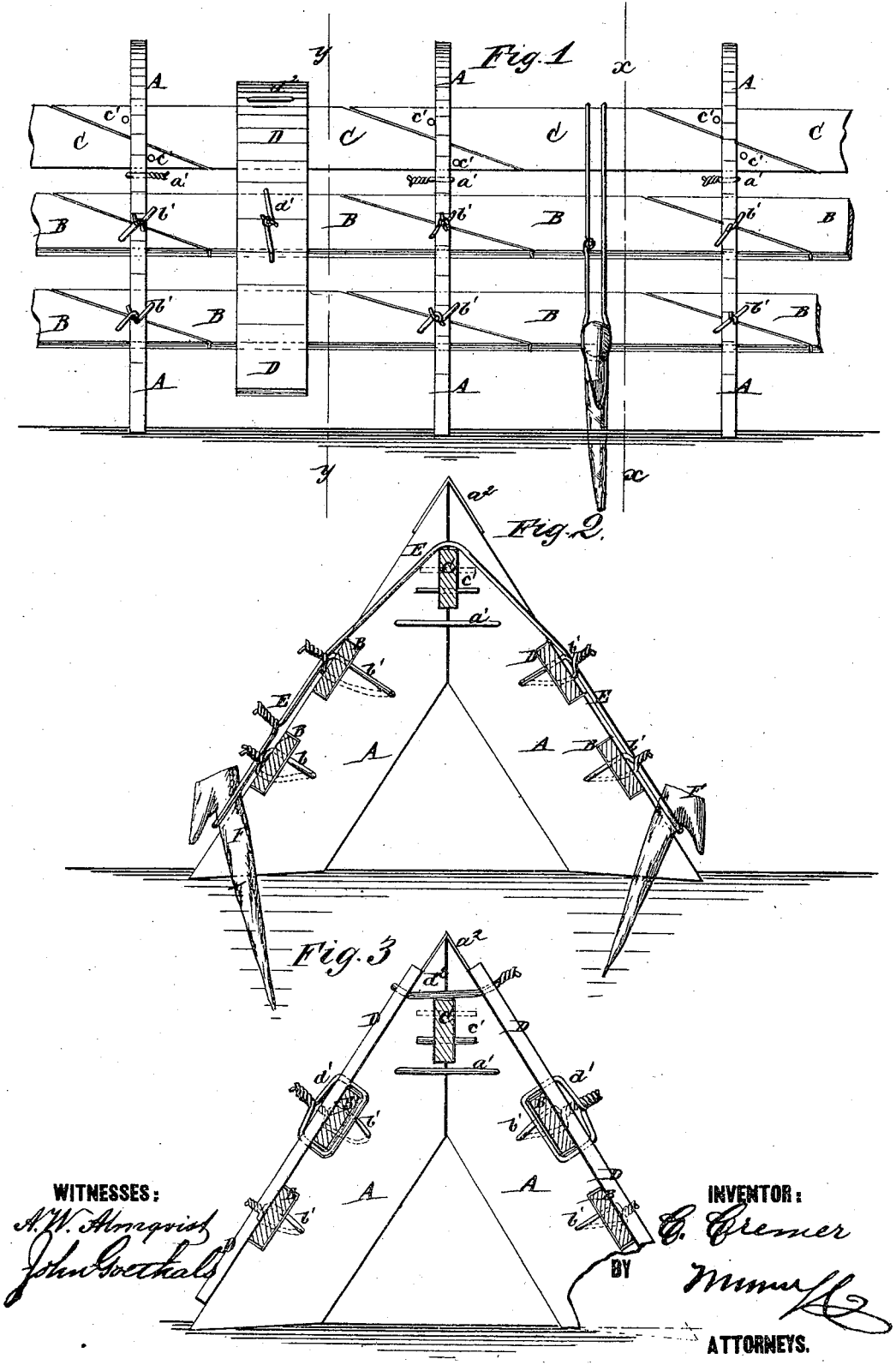

UNITED STATES PATENT OFFICE.

CHARLES CREMER, OF RED BLUFF, CALIFORNIA.

IMPROVEMENT IN FARM-FENCES.

Specification forming part of Letters Patent No. 185,217, dated December 12, 1876; application filed June 12, 1876.

*To all whom it may concern:*

Be it known that I, CHARLES CREMER, of Red Bluff, in the county of Tehama and State of California, have invented a new and useful Improvement in Portable Stock-Fence, Hedge-Protector, and Sheep-Shed, of which the following is a specification:

Figure 1 is a side view of a portion of the fence. Fig. 2 is a cross-section of the same, taken through the line $x\,x$, Fig. 1. Fig. 3 is a cross-section of the same, taken through the line $y\,y$, Fig. 1.

Similar letters of reference indicate corresponding parts.

The object of this invention is to furnish an improved fence, made without posts or nails, and which shall be so constructed that it may be used as a stock-fence, as a protector for young hedges, and as a sheep-shed, and which shall be simple in construction and reliable in use, not being liable to be pushed or blown over.

The invention will first be described in connection with the drawing, and then pointed out in claims.

A are the supporters, which are formed of two pieces of boards placed edgewise and beveled upon their lower ends to rest squarely upon the ground, and beveled at their upper ends to meet at an angle. The upper ends of the boards A are secured to each other by a wire, $a^1$, passed through holes in the said upper ends, and the ends of which are twisted together. The wire $a^1$ may be passed over and under the ridge-boards, and then twisted together, if desired. The upper ends of the boards A are further secured in place by a metal cap-strap, $a^2$, secured to their upper ends by large-headed nails. The outer edges of the boards A are notched to receive the side boards B, the edges of which are beveled to overlap each other edgewise in the notches of the supporters A, and are secured to each other and to said supporters by wires $b'$, which are passed through holes in said overlapped ends, and in said supporters, and the ends of which are twisted together, as shown in Figs. 1 and 2.

The supporters A are mortised near their outer edges to receive the side boards B, and the said side boards are secured in place by wire pins. The upper ends of the supporters A are mortised at their angles to receive the ridge-boards C, the ends of which are beveled to overlap each other edgewise in said mortises, and are secured to said supporters A by wire pins $c'$ passed through the ends of the said boards C at the opposite sides of the said supporters A.

The fence is converted into a sheep-shed by attaching to its inclined sides cover-boards D, by wires $d^1$, passed around the side boards B, and through holes in the cover-boards D, and twisting their ends together, and by the wires $d^2$ passed through their ends above the ridge-boards C, and having their ends twisted together, as shown in Figs. 1 and 3.

The fence may be anchored when desired by wires E passed over the ridge-boards C, and secured to stakes F driven into the ground.

Having thus described my invention, I claim as new and desire to secure by Letters Patent—

1. The combination, with the notched outer edges of the supporters A, of the side boards B, beveled at their ends to overlap each other edgewise in said notches, and secured to each other and to said supporters A by wires $b'$, substantially as herein shown and described.

2. The combination of the anchor-wires E and stakes F, with the fence A B C, substantially as herein shown and described.

CHARLES CREMER.

Witnesses:
W. H. BAHNY,
C. T. ALVORD.